United States Patent [19]

Schupman et al.

[11] Patent Number: 5,361,569
[45] Date of Patent: Nov. 8, 1994

[54] HARVESTER HEADER TRANSPORT APPARATUS

[76] Inventors: Arlyn L. Schupman, 2006 Eisenhower; Myron L. Schlegel, 502 W. 37th, both of Hays, Kans. 67601

[21] Appl. No.: 97,382

[22] Filed: Jul. 26, 1993

[51] Int. Cl.5 .......................................... A01D 73/00
[52] U.S. Cl. ..................................... 56/228; 56/473.5; 280/47.131; 280/79.11
[58] Field of Search ........................... 56/228, 473.5; 280/47.131, 79.11, 79.3; 172/240, 241, 242

[56] References Cited

U.S. PATENT DOCUMENTS

| | | | |
|---|---|---|---|
| 2,833,105 | 5/1958 | Naery | 56/228 |
| 3,245,695 | 4/1966 | Bernard | 56/228 |
| 3,279,158 | 10/1966 | Kirkpatrick et al. | 56/228 |
| 3,515,408 | 6/1970 | Cagle | 56/228 X |
| 3,533,640 | 10/1970 | Fator | 280/79.11 X |
| 3,736,735 | 6/1973 | Kulak et al. | 56/13.6 |
| 3,935,696 | 2/1976 | Pavel | 56/385 |
| 3,962,853 | 6/1976 | Schwalm et al. | 56/228 |
| 4,371,299 | 2/1983 | Cain et al. | 56/228 X |
| 4,384,445 | 5/1983 | McIlwain | 56/228 |
| 4,442,662 | 4/1984 | Jennings | 56/228 |
| 4,455,034 | 6/1984 | de Graff et al. | 56/228 X |
| 5,243,810 | 9/1993 | Fox et al. | 56/228 |

FOREIGN PATENT DOCUMENTS 1601738 11/1981 United Kingdom ................ 56/473.5

*Primary Examiner*—David J. Bagnell
*Attorney, Agent, or Firm*—John R. Flanagan

[57] ABSTRACT

A transport apparatus for a harvester header includes a pair of separate front and rear dollies. Each dolly includes an elongated transverse frame member having opposite lateral ends and extending in transverse relation to the direction of towing of the header, a pair of support members mounted on the transverse frame member between the opposite lateral ends thereof for underlying and supporting a lower portion of the header in a craddled relation extending across the transverse frame member, and wheels connected to the transverse frame member for movably supporting the transverse frame member to undergo movement over the ground in towing the header. Each dolly also includes an attachment member for mounting to an upper portion of the header spaced above the lower portion thereof being supported by the support members and a vertical column mounted upright on one of the lateral ends of the transverse frame member and coupled to the attachment member to undergo selective vertically slidable movement and horizontally rotatable movement relative thereto to convert the dolly between a lowered transport position in which the transverse frame member is disposed under the header and the wheels are engaged on the ground and a raised stored position in which the transverse frame member is disposed alongside the header and the wheels are spaced above and off the ground.

20 Claims, 4 Drawing Sheets

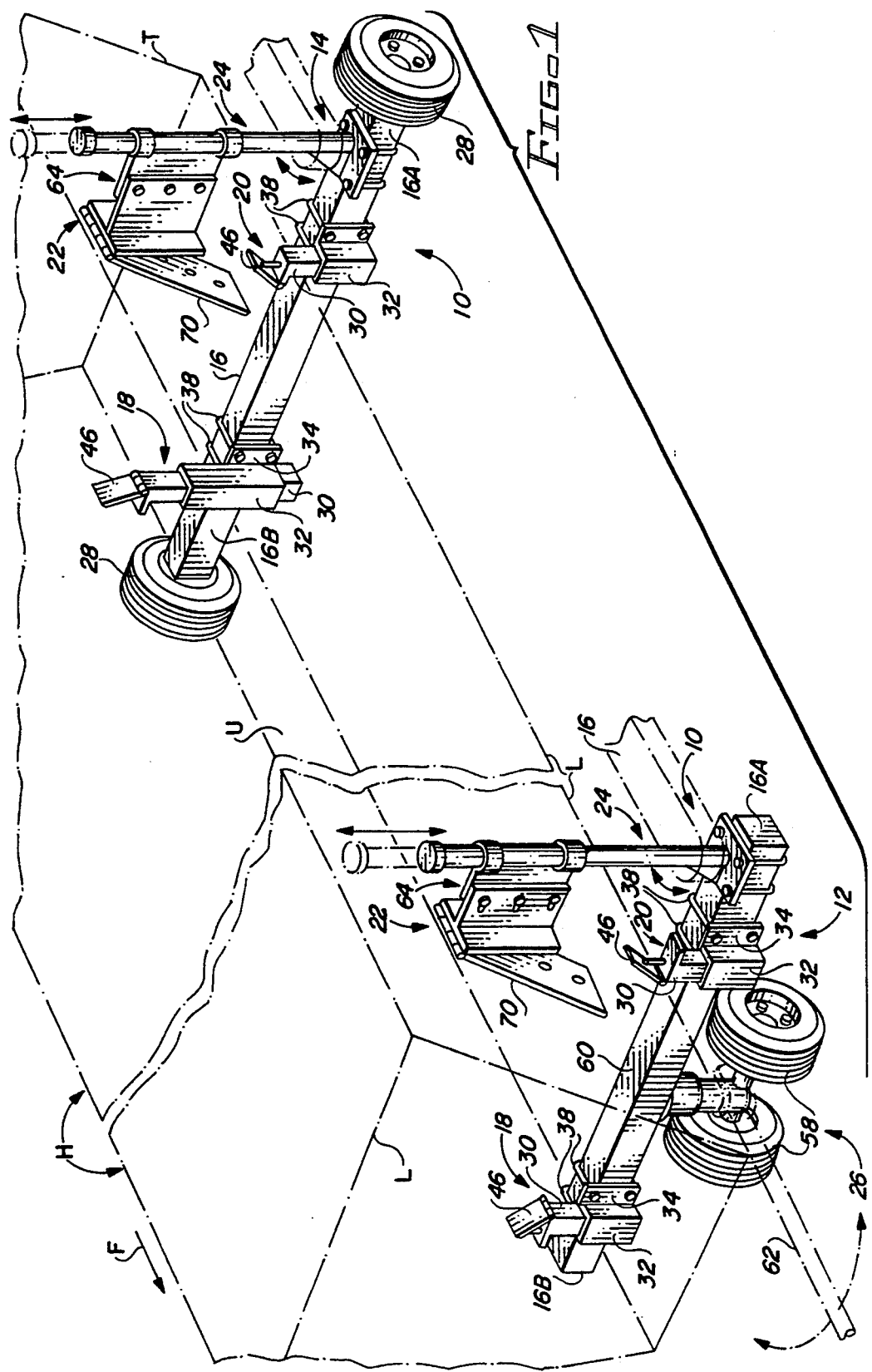

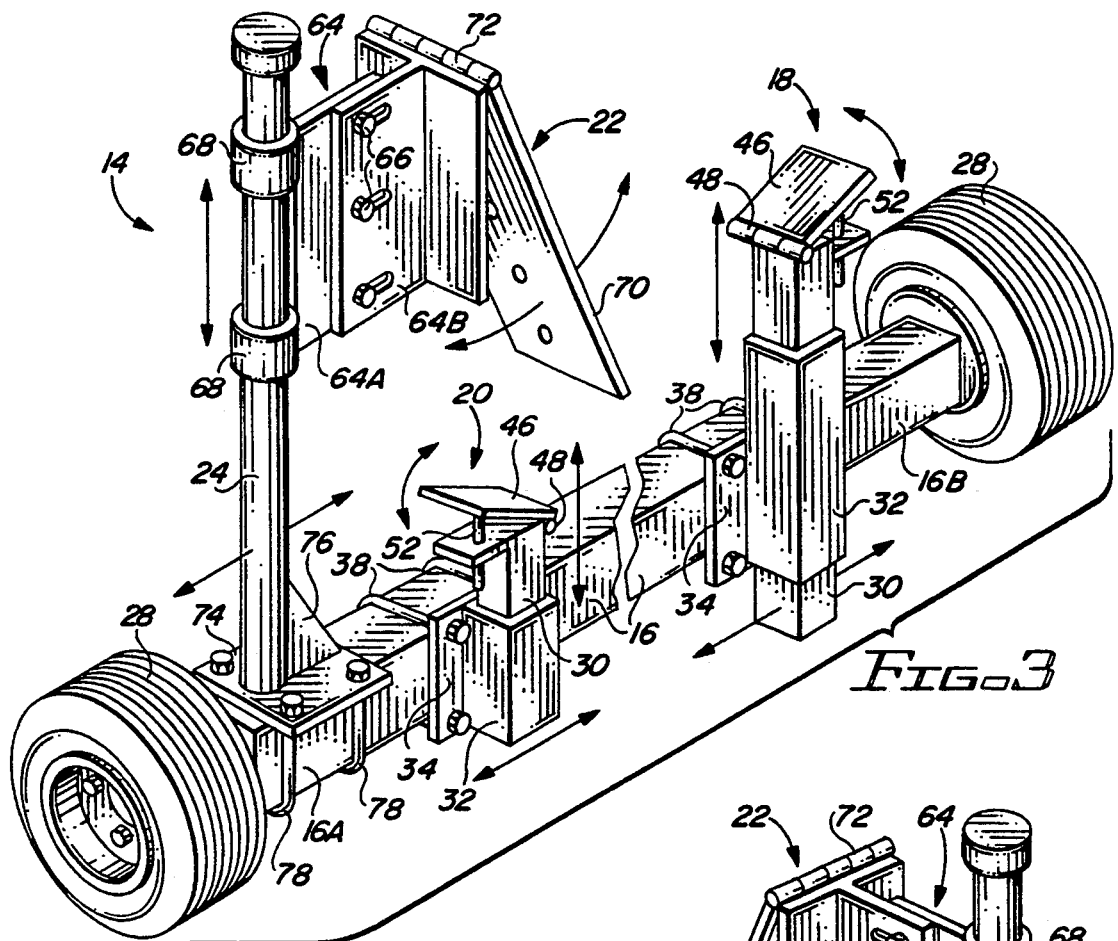
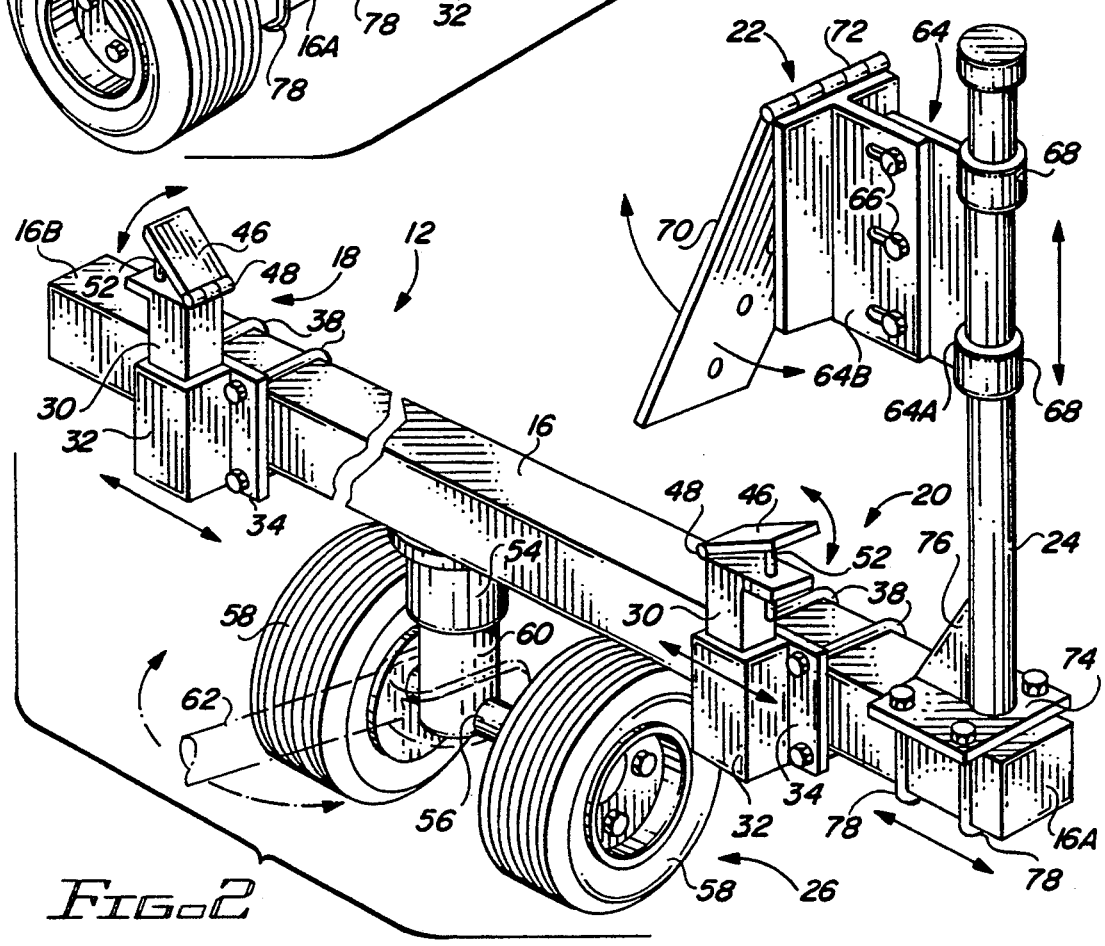

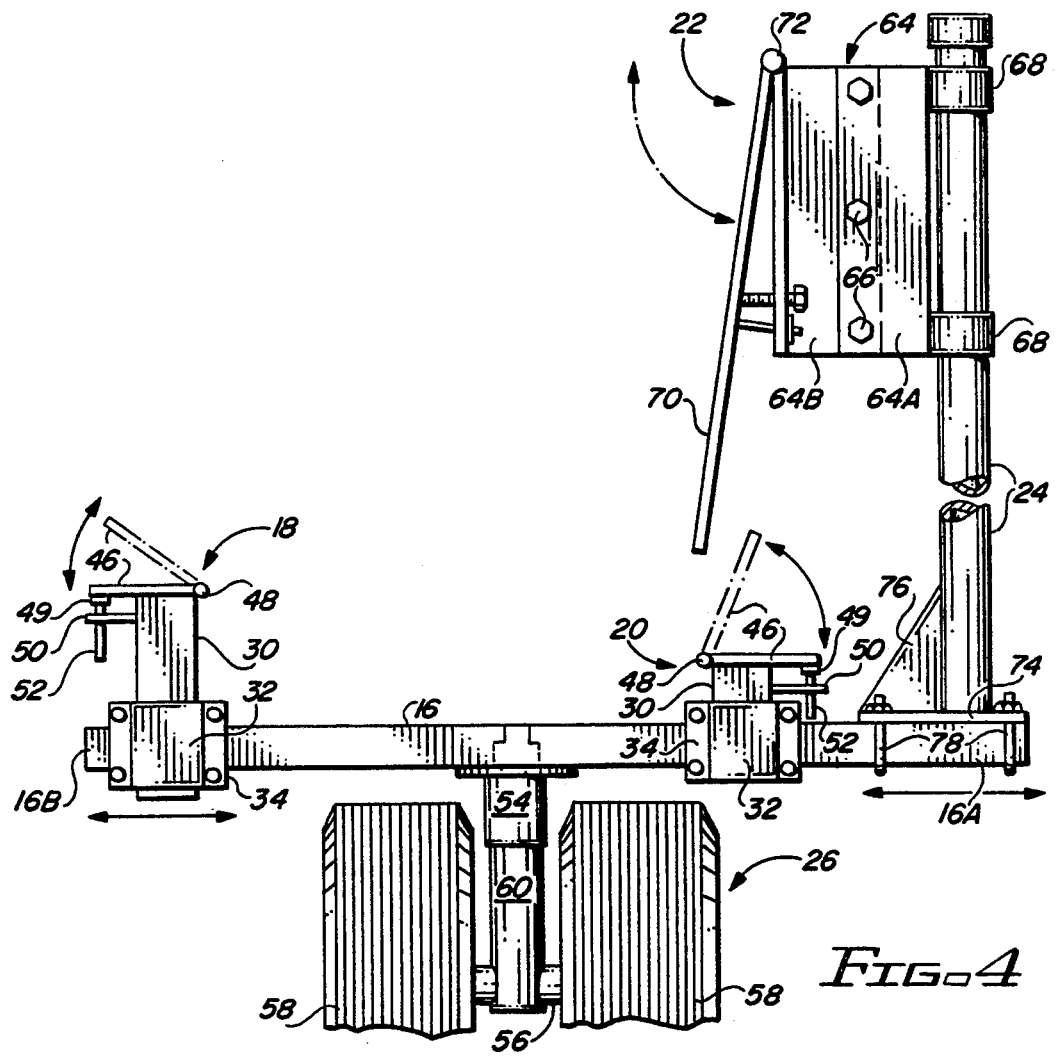
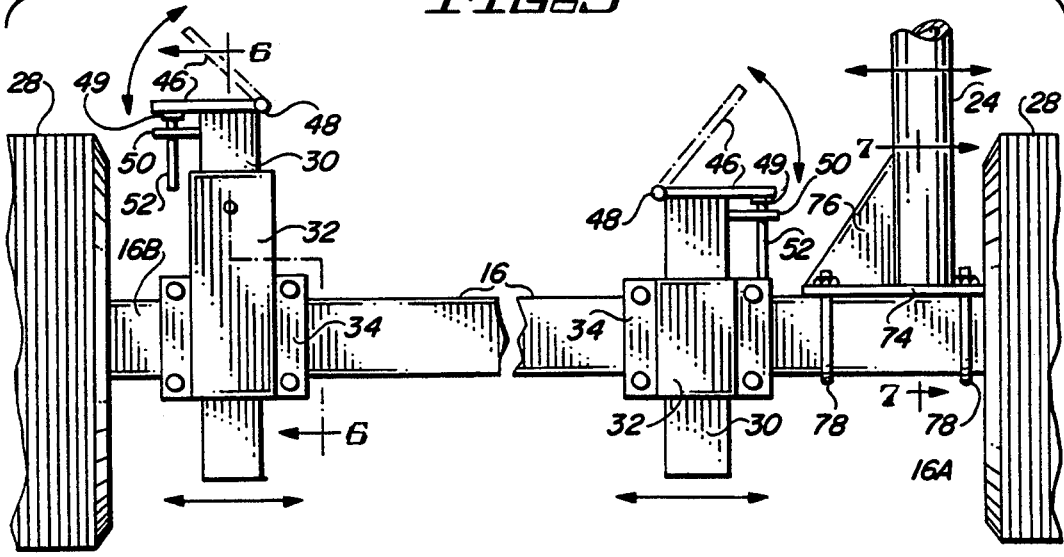

HARVESTER HEADER TRANSPORT APPARATUS

BACKGROUND OF THE INVENTION

1. Field of the Invention

The present invention generally relates to a crop harvesting headers and, more particularly, is concerned with a harvester header transport apparatus.

2. Description of the Prior Art

Crop harvesting headers used on combines to harvest grain crops, such as wheat, oats, barley, etc., generally include a reciprocating type cutterbar at its forwardmost location to sever standing crop material and initiate the crop harvesting process. Such grain headers typically include a reel to convey the severed crop material rearwardly from the cutterbar and a consolidating mechanism, such as an auger, to consolidate the severed crop material and discharge it rearwardly through an appropriate opening in the header to the threshing and separating components of the combine for further harvesting treatment.

With the advent of higher capacity combines, the size of crop harvesting headers, as measured by the length of the cutterbar extending between forwardly extending sidesheets at opposing ends of the cutterbar, has steadily increased. For example, it is not unheard of for the cutting width of current grain headers to approach thirty feet. Clearly, the trend is to increase the size of these headers as this practice decreases the amount of harvesting time necessary to harvest a given crop and increases the harvesting efficiency of the larger capacity combines.

However, increasing the size of the header creates problems of transporting the header from field to field or from one location to another, particularly if the route along which the header is transported involves the crossing or utilization of public roads. The header must first be removed from the combine and then transported separately with its cutterbar extending parallel to the direction in which the header is being moved in the transport mode.

U.S. Pat. No. 3,245,695 to Bernard proposes one apparatus for facilitating header transport on public roads. The Bernard apparatus includes front and rear trucks interconnected by a longitudinal tubular frame member extending between and attached to transverse frame members of the trucks. Each truck has mounting brace elements located along the transverse frame members for supporting the header thereon and a pair of swivel wheels mounted to and supporting the transverse frame members at the opposite ends thereof. Also, a hitch member is attached to the front truck. However, a drawback of the Bernard transport apparatus is that it must be left at the location in the field where the harvesting operation begins. By the time the harvesting is finished for the day, the combine may be several miles from its place of beginning. Thus, it is inconvenience to have to return to the beginning location to retrieve the transport apparatus.

U.S. Pat. No. 4,384,445 to McIlwain proposes another apparatus for facilitating header transport on public roads which overcomes the above-described drawback of the Bernard transport apparatus. The McIlwain transport apparatus includes first and second wheel assemblies interconnected by an axle to provide a dolly for supporting the header in a road transport condition. The first wheel assembly can be pivoted between a retracted position in which it is stored on the header during field operation of the header and a ground engaging position in which it partly supports the header during road transport of the header. The second wheel assembly is positioned on the opposite side of the header from the first wheel assembly when supporting the header during road transport. The second wheel assembly is disassembled from the axle and first wheel assembly and the axle and second wheel assembly are stored in the header during field operation of the header. Thus, the McIlwain transport apparatus overcomes the drawback of the Bernard transport apparatus by providing a self-contained apparatus which is carried with the header from location to location. However, the McIlwain transport apparatus introduces a new drawback. The conversion of the first and second wheel assemblies and the axle of the McIlwain transport apparatus between road transport and field operation modes requires assembling and disassembling of these components to and from one another. Carrying out these steps requires the expenditure of a considerable amount of time and effort.

Consequently, a need still exists for a harvesting header transport apparatus which overcomes the drawbacks of the prior art without introducing new ones in their place.

SUMMARY OF THE INVENTION

The present invention provides a harvester header transport apparatus which is designed to satisfy the aforementioned needs. The transport apparatus of the present invention has a pair of separate front and rear dollies which are convertible between lowered road transport positions in which the dollies support the header for movement in a non-operative transport mode and raised field storage positions in which the dollies are supported by the header off the ground surface as the header is moved in a harvesting mode across a field. The dollies are convertible between the lowered road transport and raised field storage positions without the need to disassemble and reassemble components of the respective dollies.

Accordingly, the present invention is directed to a transport apparatus for a harverster header which comprises a pair of separate front and rear dollies. The front dolly is a steerable dolly, whereas the rear dolly is a non-steerable dolly. Each dolly includes an elongated transverse frame member having opposite lateral ends and extending in transverse relation to the direction of towing of the header, a pair of support members mounted on the transverse frame member between the opposite lateral ends thereof for underlying and supporting a lower portion of the header in a craddled relation extending across the transverse frame member, and wheels connected to the transverse frame member for movably supporting the transverse frame member to undergo movement over the ground in towing the header. Each dolly also includes an attachment member for mounting to an upper portion of the header being spaced above the lower portion thereof supported by the support members, and a vertical column mounted upright on one of the lateral ends of the transverse frame member and coupled to the attachment member to undergo selective vertically slidable movement and horizontally rotatable movement relative thereto to convert the dolly between a lowered transport position in which the transverse frame member is disposed under the header and the wheels are engaged on the ground and a raised stored position in which the transverse frame member is disposed alongside the header and the wheels are spaced above and off the ground.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a set of separate front and rear dollies of a transport apparatus of the present invention, the dollies being shown in operative position for transporting a harvester header which is shown in phantom outline form.

FIG. 2 is a front perspective view of the front steerable dolly of the transport apparatus of FIG. 1.

FIG. 3 is a rear perspective view of the rear non-steerable dolly of the transport apparatus of FIG. 1.

FIG. 4 is a fragmentary front elevational view of the front steerable dolly of the transport apparatus of FIG. 1.

FIG. 5 is a fragmentary front elevational view of the rear non-steerable dolly of the transport apparatus of FIG. 1.

DETAILED DESCRIPTION OF THE INVENTION

Figure 6:
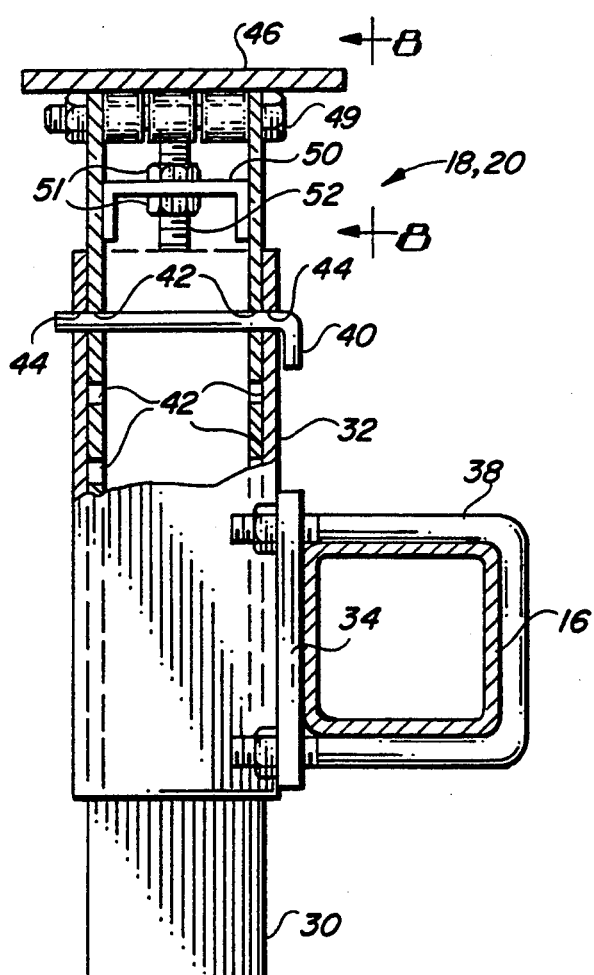
FIG. 6 is an enlarged fragmentary sectional view of a support member of the transport apparatus taken along line 6—6 of FIG. 5.

Referring to the drawings and particularly to FIGS. 1-3, there is illustrated a transport apparatus of the present invention, being generally designated 10, for supporting and transporting a harvester header H, shown only in phantom outline form in FIG. 1. Basically, the transport apparatus 10 includes a set or pair of fore-and-aft spaced apart and separate front and rear dollies 12, 14. The front dolly 12 is a steerable dolly, whereas the rear dolly 14 is a non-steerable dolly.

Referring to FIG. 1, the front steerable dolly 12 and rear non-steerable dolly 14 of the transport apparatus 10 respectively support a forward or leading portion L and a rearward or trailing portion T of the harvester header H relative to a forward direction F in which the header H is towed over the ground surface by utilizing the dollies 12, 14 of the transport apparatus 10. The steerable dolly 12 and non-steerable dolly 14 each basically includes an elongated transverse axle or frame member 16 having opposite lateral ends 16A, 16B, a pair of right and left support members 18, 20 mounted on the transverse frame member 16, a mounting assembly 22 attachable to the header H, and a substantially vertical column 24 mounted upright on one lateral end 16A of the transverse frame member 16 and slidably coupled to the mounting assembly 22. Also, the front dolly 12 includes a steerable wheel assembly 26 supporting the transverse frame member 16 thereof midway between its opposite lateral ends 16A, 16B. The rear dolly 14 includes a pair of wheels 28 rotatably supporting the transverse frame member 16 thereof at its opposite lateral ends 16A, 16B. The wheels 28 are rotatable about a common horizontal axis.

When the front and rear dollies 12, 14 are installed in the transport mode, as seen in FIG. 1, their respective transverse frame members 16 extend in generally transverse relation to the forward direction F of towing of the header H. In the illustrated example, the transverse frame member 16 of each dolly 12, 14 is an elongated hollow rigid tube 16 having a substantially square cross-sectional shape. The right and left support members 18, 20 are attached on the transverse frame member 16 between the opposite lateral ends 16A, 16B thereof so as to underlie and support at selected positions a lower portion L of the header H in a craddled relation extending across the transverse frame member 16.

More particularly, referring to FIGS. 1-6, each of the support members 18, 20 of the dollies 12, 14 includes a pair of telescoped tubular inner and outer support posts 30, 32 of square cross-sectional shapes being positioned vertically along the front sides of the respective transverse frame members 16 of the dollies 12, 14. The inner support post 30 extends through the outer support post 32, whereas the outer support post 32 is rigidly attached to a plate 34 which fits between the transverse axle 16 and the vertical outer post 32. The plate 34 is fastened to the axle 16 by a pair of U-shaped bolts 38 which fit over the transverse frame member 16. By first loosening and then tightening the bolts 38 the support posts 30, 32 can be relocated to any desired horizontal position along the transverse frame member 16. The inner support post 30 can be adjustably retained in any desired vertically extended or retracted position relative to the outer support post 32 by a pin 40 transversely inserted across the inner and outer support posts 30, 32 through selected aligned pairs of a plurality of vertically spaced pairs of holes 42, 44 defined respectively in the inner and outer support posts 30, 32.

Figure 9:
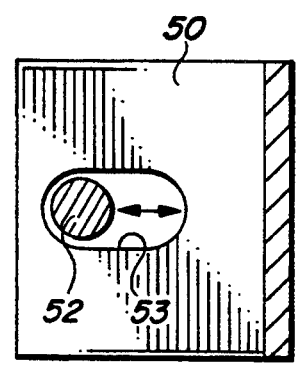
FIG. 9 is a top plan view taken along line 9—9 of FIG. 8.
Figure 8:
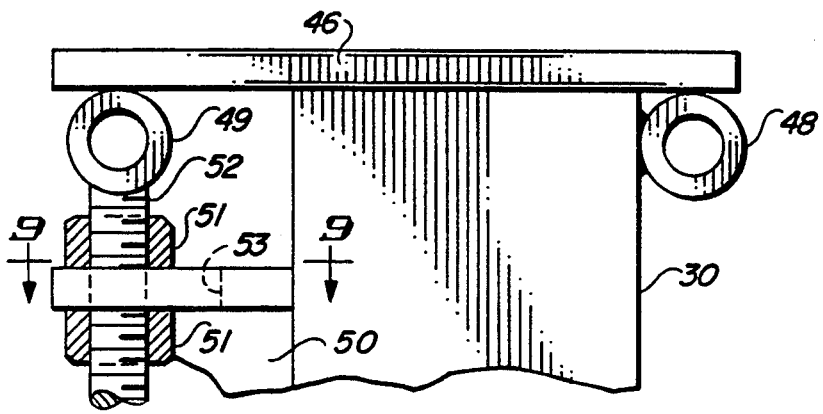
FIG. 8 is an enlarged fragmentary elevational view taken along line 8—8 of FIG. 6.

Also, referring to FIGS. 6, 8 and 9, each of the support members 18, 20 of the dollies 12, 14 includes a tiltable header support pad 46 mounted on the top of the inner support post 30. The support pad 46 is pivotally mounted along one edge by a hinge 48 to one side of the top of the inner support post 30. The support pad 46 is positionable in a desired tilted angle relative to the top of the inner support post 30, which conforms to the angular configuration of the lower portion L of the header that contacts the support pad 46. The support pad 46 is supported at the desired position by a bracket 50 fixed on and protruding outwardly from an opposite side of the top of the inner support post 30 and by a link 52 extending between and threadably connected by pair of nuts 51 to the bracket 50 and pivotally interconnected by a hinge 49 to the support pad 46. The link 52 extends through an oblong slot 53 defined in the bracket 50. The oblong shape of the slot 53 permits the link 52 to be displaced relative to the bracket 50 between the opposite ends of the slot 53 when the tilted position of the support pad 46 is changed. The link 52 is externally threaded to threadably receive the pair of nuts 51 thereon disposed on opposite sides of the bracket 50 for tighting and fixedly connecting the link 52 at any desired position along the slot 53.

The steerable wheel assembly 26 of the front dolly 12 is connected to the transverse frame member 16 of the front dolly 12 substantially midway between the opposite lateral ends 16A, 16B of the transverse frame member 16 for movably and steerably supporting the transverse frame member 16 to undergo movement over the ground in towing of the header H. More particularly, as seen in FIGS. 1, 2 and 4, the steerable wheel assembly 26 includes a swivel mount 54 attached to and extending downwardly below the transverse frame member 16, an elongated axle 56, a pair of wheels 58 mounted to opposite ends of the axle 56 for undergoing rotational motion about a horizontal axis, and a pivot shaft 60 mounted to the swivel mount 54 for undergoing rotational motion about a vertical axis and supporting at its upper end the swivel mount 54 and thereby the transverse frame member 16 supported by the swivel mount 54. The pivot shaft 60, in turn, is supported at its lower end by the horizontal axle 56 extending between and rotatably mounting the wheels 58. The transport apparatus 10 also includes an elongated tongue 62 pivotally connectable to the pivot shaft 60 for use in steerable towing the front dolly 12 and thereby towing the rear dolly 14 and header H therewith.

The mounting assembly 22 of each of the dollies 12, 14 is adapted for attachment to an upper portion U of the header H spaced above the lower portion L thereof which, as described above, is supported by the support members 18, 20 on each of the transverse frame members 16. More particularly, the mounting assembly 22 includes a bracket 64 having an outer portion 64A, an inner portion 64B releasably fastened, such as by bolts 66, to the outer portion 64A, and pair of annular ring-shaped members 68 rigidly attached to the outer portion 64A of the bracket 64 and vertically spaced from one another and fitted over and about the vertical column 24. The mounting assembly 22 also includes an attachment member 70 attachable by fasteners (not shown) to the upper portion U of the header H and being pivotally connected at one end by a hinge 72 to the top of the inner portion 64B of the bracket 64 so as to permit pivotal tilting of the respective dolly 12, 14 between an upright position relative to the header H, as shown in FIG. 1, in which the respective transverse frame member 16 underlies the header H and an inverted position (not shown) relative to the header H in which the transverse frame member 16 substantially overlies the header H. This latter position is used should the header H and dollies 12, 14 be loaded together for transport on a truck bed, instead of the dollies 12, 14 being used to transport the header.

Figure 7:
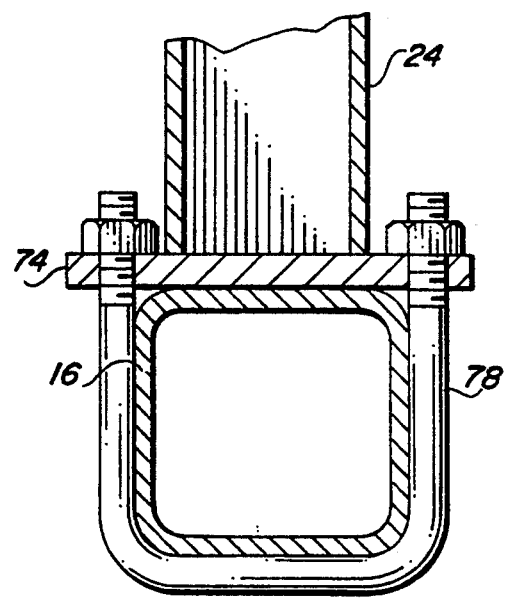
FIG. 7 is an enlarged fragmentary sectional view of a vertical column of the transport apparatus taken along line 7—7 of FIG. 5.

The vertical column 24 of each of the dollies 12, 14 is mounted upright on the one end 16A of the opposite lateral ends 16A, 16B of the respective transverse frame member 16. As seen in FIG. 7, a horizontal plate 74 and reinforcing brace 76 are rigidly attached to the lower portion of the vertical column 24 and a pair of U-shaped bolts 78 are fitted under the one lateral end 16A of the transverse frame member 16 and fastened to the plate 74 to secure the vertical column 24 upon the transverse frame member 16. By first loosening and then tightening the bolts 78 the vertical column 24 can be relocated to a desired horizontal position along the transverse frame member 16. Also, the vertical column 24 extends through and is slidably coupled by the annular members 68 of the mounting assembly 22 so as to undergo selective vertically slidable movement and horizontally rotatable movement relative thereto in order to convert each of the respective dollies 12, 14 between a lowered transport position, as seen in solid line form in FIG. 1, and a raised stored position, as partially seen in dashed line form in FIG. 1. In the lower transport position, the transverse frame member 16 of each dolly 12, 14 is disposed under the header H and the respective wheels 28, 58 are engaged on the ground. In the raised stored position, the transverse frame member 16 of each dolly 12, 14 is disposed alongside the header H and the respective wheels 28, 58 are spaced above and off the ground.

A winch mechanism (not shown) can be used to elevate and lower the transverse frame members 16, wheels 28, 58 and vertical columns 24 relative to the mounting assemblies 22 and the header H in raising and lowering the dollies 12, 14 between the transport and storage positions relative to the header H, once the transverse frame members 16 have been rotated approximately 90° about the vertical axis of the upright columns 24 from the transverse position under the header H to the parallel position alongside the header H. Alternatively, the dollies 12, 14 can be converted manually between the transport and storage positions.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

We claim:

1. A steerable transport dolly for supporting a portion of a harvester header during towing thereof in a predetermined direction over the ground, said dolly comprising:
    (a) an elongated transverse frame member having opposite lateral ends and extending in transverse relation to the direction of towing of the header;
    (b) support means mounted on said transverse frame member between said opposite lateral ends thereof for underlying and supporting a lower portion of the header in a craddled relation extending across said transverse frame member;
    (c) steering means connected to said transverse frame member between said opposite lateral ends thereof for movably and steerably supporting said transverse frame member to undergo movement over the ground in towing the header;
    (d) attachment means for mounting to an upper portion of the header spaced above the lower portion thereof being supported by said first means; and
    (e) a vertical column mounted upright on one of said lateral ends of said transverse frame member and coupled to said attachment means to undergo selective vertically slidable movement and horizontally rotatable movement relative to said attachment means to convert said dolly between a lowered transport position in which said transverse frame member is disposed under the header and said steering means is engaged on the ground and a raised stored position in which said transverse frame member is disposed alongside the header and said steering means is spaced above and off the ground.

2. The dolly of claim 1 wherein said support means includes a pair of support members mounted on said transverse frame member between said lateral ends thereof and being adjustable to a selected position for underlying and supporting the lower portion of the header in the craddle-like relation.

3. The dolly of claim 1 wherein said steering means includes:
  a swivel mount attached to and extending downwardly below said transverse frame member;
  an axle;
  a pair of wheels mounted to opposite ends of said axle for undergoing rotational motion about a horizontal axis; and
  a pivot shaft mounted to said swivel mount for undergoing rotational motion about a vertical axis and supporting at an upper end said swivel mount and said transverse frame member supported by said swivel mount, said pivot shaft being supported at a lower end by said axle between said pair of wheels.

4. The apparatus of claim 3 further comprising:
  an elongated tongue pivotally connectable to said pivot shaft for use in steerable towing the dolly and header therewith.

5. The dolly of claim 1 wherein said attachment means is a mounting assembly attachable to the upper portion of the header.

6. The dolly of claim 5 wherein said mounting assembly includes a bracket having a pair of annular members vertically spaced from one another and fitted over and about said column.

7. The dolly of claim 6 wherein said mounting assembly also includes an attachment member attachable to the header and being pivotally connected at one end to said bracket so as to permit pivotal tilting of said steerable dolly between an upright position relative to the header in which said transverse frame member underlies the header and an inverted position relative to the header in which said transverse frame member overlies the header.

8. A non-steerable transport dolly for supporting a portion of a harvester header during towing thereof in a predetermined direction over a ground surface, said dolly comprising:
  (a) an elongated transverse frame member having opposite lateral ends and extending in transverse relation to the direction of towing of the header;
  (b) support means mounted on said transverse frame member between said opposite lateral ends thereof for underlying and supporting a lower portion of the header in a craddled relation extending across said transverse frame member;
  (c) non-steering means connected to said transverse frame member at each of said respective opposite lateral ends thereof for movably and non-steerably supporting said transverse frame member to undergo movement over the ground in towing the header;
  (d) attachment means for mounting to an upper portion of the header spaced above the lower portion thereof being supported by said first means; and
  (e) a vertical column mounted upright on one of said lateral ends of said transverse frame member and coupled to said attachment means to undergo selective vertically slidable movement and horizontally rotatable movement relative to said attachment means to convert said dolly between a lowered transport position in which said transverse frame member is disposed under the header and said steering means is engaged on the ground and a raised stored position in which said transverse frame member is disposed alongside the header and said steering means is spaced above and off the ground.

9. The dolly of claim 8 wherein said support means includes a pair of support members mounted on said transverse frame member between said lateral ends thereof and being adjustable to a selected position for underlying and supporting the lower portion of the header in the craddle-like relation.

10. The dolly of claim 8 wherein said non-steering means includes a pair of wheels each being mounted to one of said opposite lateral ends of said transverse frame members for undergoing rotational motion about a horizontal axis.

11. The dolly of claim 8 wherein said attachment means is a mounting assembly attachable to the upper portion of the header.

12. The dolly of claim 11 wherein said mounting assembly includes a bracket having a pair of annular members vertically spaced from one another and fitted over and about said column.

13. The dolly of claim 12 wherein said mounting assembly also includes an attachment member attachable to the header and being pivotally connected at one end to said bracket so as to permit pivotal tilting of said steerable dolly between an upright position relative to the header in which said transverse frame member underlies the header and an inverted position relative to the header in which said transverse frame member overlies the header.

14. A transport apparatus for a harvester header, said transport apparatus comprising:
  (a) a pair of separate front and rear dollies convertable between lowered road positions in which the dollies support the header for movement in a nonoperative transport mode and raised field positions in which the dollies are supported by the header off the ground surface as the header is moved in a harvesting mode across a field;
  (b) each of the front and rear dollies including
    (i) an elongated transverse frame member having opposite lateral ends and extending in transverse relation to the direction of towing of the header;
    (ii) support means mounted on said transverse frame member between said opposite lateral ends thereof for underlying and supporting a lower portion of the header in a craddled relation extending across said transverse frame member;
    (iii) rotatable means connected to said transverse frame member for movably supporting said transverse frame member to undergo movement over the ground in towing the header;
    (iv) attachment means for mounting to an upper portion of the header spaced above the lower portion thereof being supported by said first means; and
    (v) a vertical column mounted upright on one of said lateral ends of said transverse frame member and coupled to said attachment means to undergo selective vertically slidable movement and horizontally rotatable movement relative to said attachment means to convert said dolly between a lowered transport position in which said transverse frame member is disposed under the header and said steering means is engaged on the ground and a raised stored position in which said transverse frame member is disposed alongside the header and said steering means is spaced above and off the ground.

15. The apparatus of claim 14 wherein said rotatable means is at least one steerable wheel assembly connected to said transverse frame member between said opposite lateral ends thereof for movably and steerably supporting said transverse frame member to undergo movement over the ground in towing the header.

16. The apparatus of claim 14 wherein said rotatable means is a pair of non-steerable wheels connected to said transverse frame member at said respective opposite lateral ends thereof for movably and non-steerably supporting said transverse frame member to undergo movement over the ground in towing the header.

17. The apparatus of claim 14 wherein said support means includes a pair of support members mounted on said transverse frame member between said lateral ends thereof and being adjustable to a selected position for underlying and supporting the lower portion of the header in the craddle-like relation.

18. The apparatus of claim 14 wherein said attachment means is a mounting assembly attachable to the upper portion of the header.

19. The apparatus of claim 18 wherein said mounting assembly includes a bracket having a pair of annular members vertically spaced from one another and fitted over and about said column.

20. The apparatus of claim 19 wherein said mounting assembly also includes an attachment member attachable to the header and being pivotally connected at one end to said bracket so as to permit pivotal tilting of said steerable dolly between an upright position relative to the header in which said transverse frame member underlies the header and an inverted position relative to the header in which said transverse frame member overlies the header.

* * * * *